United States Patent [19]

Snopkowski

[11] Patent Number: 4,879,189

[45] Date of Patent: Nov. 7, 1989

[54] FUEL CELL AIR PRESSURIZATION SYSTEM AND METHOD

[75] Inventor: Daniel J. Snopkowski, Wethersfield, Conn.

[73] Assignee: International Fuel Cells Corporation, South Windsor, Conn.

[21] Appl. No.: 199,818

[22] Filed: May 27, 1988

[51] Int. Cl.[4] .................. H01M 8/00; H01M 8/04
[52] U.S. Cl. ................................ 429/13; 429/17; 429/23
[58] Field of Search ..................... 429/13, 17, 23

[56] References Cited

U.S. PATENT DOCUMENTS

| | | | |
|---|---|---|---|
| 3,576,677 | 4/1971 | Keating et al. | 429/23 |
| 4,128,700 | 12/1978 | Sederquist | 429/17 |
| 4,202,933 | 5/1980 | Reiser et al. | 429/13 |
| 4,407,903 | 10/1983 | Gutbier et al. | 429/23 |
| 4,743,517 | 5/1988 | Cohen et al. | 429/17 |

FOREIGN PATENT DOCUMENTS

| | | | |
|---|---|---|---|
| 58-133779 | 8/1983 | Japan | 429/13 |
| 60-091568 | 5/1985 | Japan | 429/23 |

Primary Examiner—Stephen J. Kalafut
Attorney, Agent, or Firm—William W. Jones; Edward L. Kochey, Jr.

[57] ABSTRACT

Pressurization air systems in a multimodule fuel cell power plant are interconnected to provide improved power plant operating efficiency at part load. Each power generation module air pressurization subsystem has its own turbocompressor to provide a compressed air supply to its own power generation subsystem at rated power plant load. When load demand on the power plant is reduced, some of the turbocompressors in the interconnected power generation modules in the plant are shut off. The interconnecting valves are opened so that the remaining turbocompressors can supply all of the compressed air needed by all of the power generation subsystems in the interconnected power generation modules.

7 Claims, 1 Drawing Sheet

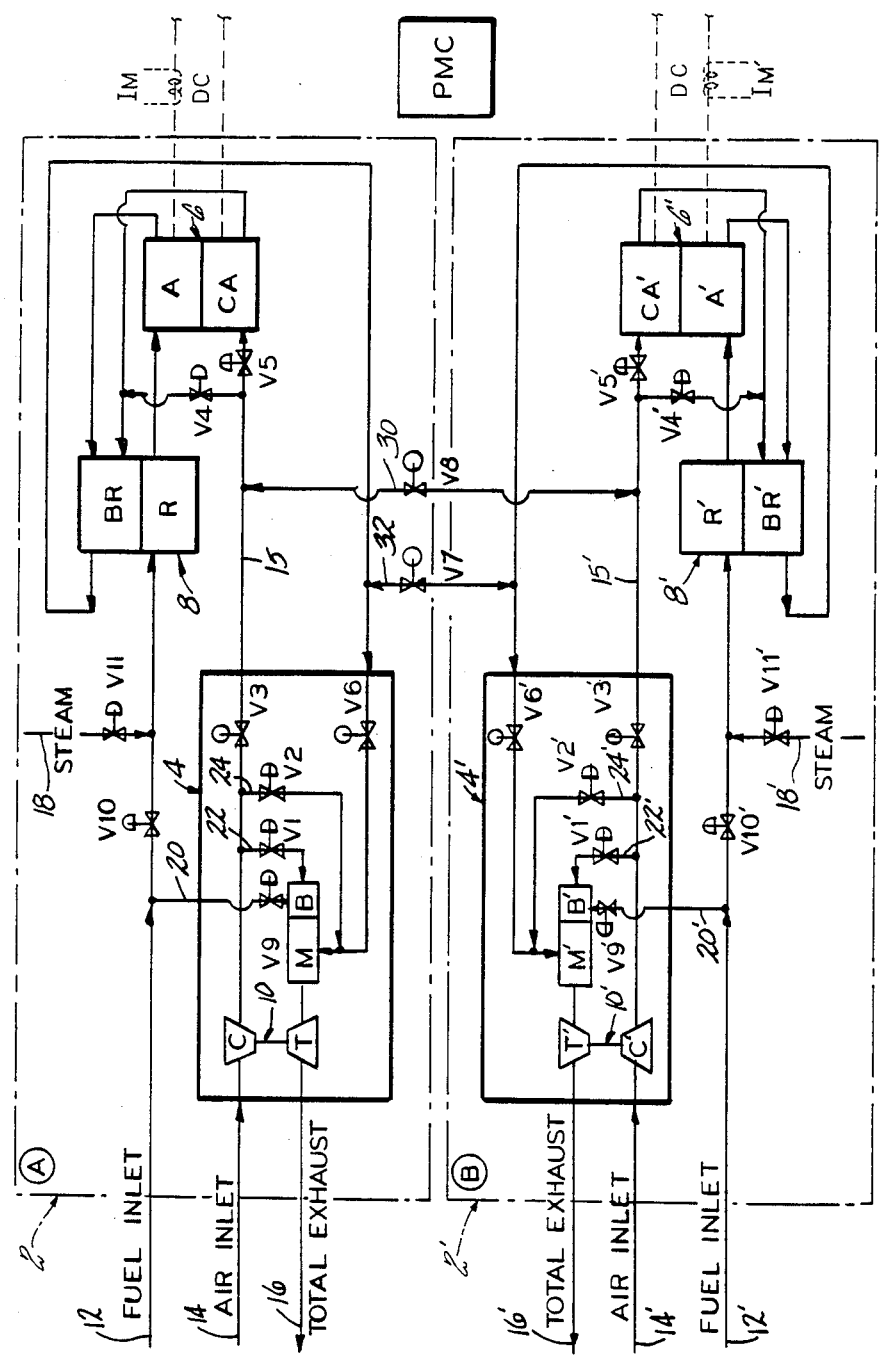

FUEL CELL AIR PRESSURIZATION SYSTEM AND METHOD

DESCRIPTION

1. Technical Field

This invention relates to a pressurized multimodule fuel cell power plant which has improved part load operating efficiency.

2. Background Art

A pressurized fuel cell power plant can be made up of a plurality of power generation modules, each of which will have its own subsystems. For example, each power generation module will have its own air pressurization subsystem; its own fuel processing subsystem; its own DC power generation subsystem, and its own DC to AC power conversion subsystem. Additionally, each power generation module will share certain other systems needed in the power plant with all of the other power generation modules. Examples of shared systems are the raw fuel supply system, the heat rejection system, and the condensate water treatment system.

The air pressurization subsystem in each power generation module will include a turbocompressor, an auxiliary burner and gas mixer, and valved conduits for supplying fuel to the burner, and/or power generation module exhaust gases to the gas mixer, to drive the turbocompressor. In each module, in order to supply the required pressurized air to the power generation section at constant pressure, the turbocompressor will run at a fixed rate. The energy needed to run the turbocompressor at this fixed rate will derive from raw fuel fed to the burner an/or from hot fuel processing subsystem exhaust gases fed to the mixer. When the load demand is high in the power plant and therefore in each module, most of the energy needed to run the turbocompressor is supplied by the fuel processing subsystem burner exhaust, and little or none of the required energy is supplied by raw fuel. Thus, better fuel economies are realized when the power plant is operated at high load demand levels. As load demand drops off, the supply of raw fuel to the burner must be increased because the energy in each fuel processing subsystem burner exhaust decreases and, as previously noted, a drop in power plant output does not result in a lowering of operating energy demanded by each turbocompressor. Thus, at lower power plant load demand levels, power plant operating efficiency decreases due to the increase in raw fuel required to operate the turbocompressor.

DISCLOSURE OF INVENTION

This invention is directed to a system for increasing power plant part power operating efficiency for a multimodule pressurized fuel cell power plant of "n" modules whenever the load demand level is less than $$\left(\frac{n-1}{n}\right)$$

of maximum load capacity.

In order to accomplish this increase in operating efficiency, all of the air pressurization subsystems in the "n" modules are interconnected to common air out and turbine operating gas in manifolds. Thus, when the load demand level for the plant falls below $$\left(\frac{n-1}{n}\right)$$

of maximum load capacity, one of the air pressurization subsystems in one of the modules will be shut down, and valves in the interconnecting manifolds between modules will be opened. At that point, the operating air pressurization subsystems will supply pressurized air to all of the power generation subsystems, and the operating air pressurization subsystems will receive energy from the reformer burner exhausts from all of the fuel processing subsystems. After one of the air pressurization subsystems is shut down, there will no longer be any raw fuel flow to air pressurization subsystem which was shut down and there will be less raw fuel to the remaining operating air pressurization subsystems since the waste heat from "n" fuel processing subsystems is now being directed to "n−1" air pressurization subsystems. These effects will increase the efficiency of the total power plant at the $$\left(\frac{n-1}{n}\right)$$

of power level. When the load demand is reduced to $$\left(\frac{n-2}{n}\right)$$

of rated power, further efficiency improvement improvement can be achieved by shutting down two air pressurization subsystems.

In a generic sense, the equation used can be stated as $$\left(\frac{n-a}{n},\right)$$

wherein practical limitations suggest that "n" will be an integer selected from the group of 2, 3, 4 or 5, which will be the number of power generation modules tied together via common air pressurization subsystem inlet and outlet manifolds. Operating limitations suggest that no more than five such power modules should be thus tied together in this fashion. Furthermore, "a" will be an integer which is greater than zero but no greater than n−1. Thus "a" will be selected from the group of integers 1, 2, 3 or 4.

It is therefore, an object of this invention to provide a pressurized fuel cell power plant which achieves improved part load operating efficiency.

BRIEF DESCRIPTION OF THE DRAWING

These and other objects and advantages of the invention will become more readily apparent from the accompanying drawing which is a schematic representation of a pair (n=2) of power generation modules interconnected together in accordance with this invention. Operation with more than two power generation modules up to the aforesaid practical limit of five, is similar.

BEST MODE FOR CARRYING OUT THE INVENTION

Referring to the drawing, there is shown a pair of power generation modules 2 and 2' which are functionally interconnected as will be described hereinafter. It will be noted that both of the modules 2 and 2' are substantially identical in construction. Each module includes an air pressurization subsystem 4 and 4'; a power generation subsystem 6 and 6'; and a fuel processing subsystem 8 and 8'. The air pressurizing subsystems 4 and 4' each include turbocompressors 10 and 10' in which a turbine T or T' operates a compressor C or C', respectively. Additionally, the air pressurizing subsystem includes an auxiliary burner B or B' and an associated mixer M or M' for supplying the hot working gases to the turbine T or T' to operate the latter. The power generation subsystem 6 or 6' contains the fuel cell stack where the electrochemical power generation reaction takes place, and includes cathode and anode electrodes CA or CA' and A or A', respectively, of conventional construction. The fuel processing subsystem 8 or 8' includes a steam catalytic fuel reformer R or R' and an associated burner BR or BR'.

Each power generation module 2 and 2' has a raw fuel inlet line 12 (12'), an air inlet line 14 (14'), and an exhaust line 16 (16'). Steam is supplied to each reformer R (R') by separate steam lines 18 (18'). Each power generation module 2 (2') will be started up in the same manner. After the turbocompressor T-C (T'-C') is brought to an intermediate speed by an auxiliary system, raw fuel will be fed from the inlet line 12 (12') into the turbocompressor burner B (B') through line 20 (20') via valve V9 (V9'). At the same time, air is fed into the mixer burner B (B') and mixer M (M') through lines 22 (22') and 24 (24'), with valves V1 (V1') and V2 (V2') open and valve V3 (V3') closed. After the turbocompressor reaches its operating speed, the valve V3 (V3') will open, and the valves V4 (V4') and V10 (V10') will allow air and fuel to flow to the reformer burner BR (BR'). Once reformer operating temperature conditions are reached, raw fuel through line 29 (29') and V11 (V11') can mix with steam from line 18 (18') and V12 (V12') prior to entering the reformer R (R'). The exhaust from the reformer burner BR (BR') provides energy to the mixer M (M') with valve V6 (V6') open. At this point, the valve V10 (V10') will be closed. When the plant is operating at close to capacity load demand, the valves V7 and V8 will remain closed so that the crossover manifolds 30 and 32 will be closed. As noted, when the power plant is running at or close to capacity, the energy to operate each turbocompressor is derived from its associated reformer burner exhaust, through line 28 (28') and the valves V9 (V9'), V1 (V1') and V2 (V2') are throttled back, so that little or no fuel from line 20 (20') is used. Thus substantially all of the raw fuel is consumed by the power generation modules and is used in the electrochemical reaction. Thus, at high load demand, raw fuel is efficiently used. As load demand drops, however, more and more raw fuel must be fed to the burner B (B') to keep each turbocompressor operating at its fixed, preset level. Thus, as load drops, the power generating modules become less and less efficient users of the raw fuel. Load output from each module is constantly monitored by current sensor $I_m$ and ($I_m'$).

In the device shown in the drawing, when the load demand reaches 50%, $$\left(\frac{n-1}{n}\right) = .5,$$

or lower, of rated capacity, one of the air pressurization subsystems 4 or 4' can be shut down while the other will remain operating. Prior to shutdown, approximately 50% of the air output from compressors C (C') is not being used in the cathodes CA (CA') and is being returned to the mixer M (M') via valves V2 (V2'). Assume, for instance, that the subsystem 2' is shut down, and the subsystem 2 continues to operate. When the subsystem 2' is shut down, the valve V3' is closed, as is the valve V6' and the valves V7 and V8 are opened. Thus, pressurized air from the compressor C flows through line 15 to the cathode CA and the reformer burner BR. At the same time, pressurized air from the compressor C flows through line 30 to line 15' and hence to the cathode CA' and reformer burner BR'. The closed valve V3' prevents pressurized airflow from flowing back toward the compressor C'. Reformer burner exhaust from the burner BR passes to the mixer M through the line 28, and exhaust from the burner BR' passes to the mixer M through the lines 28', 32 and 28. Closure of the valve V6' prevents the burner exhaust from reaching the mixer M'. Thus, the entire pressurized air output from the compressor C, which is enough to operate one power module at full load capacity, is split equally between the two modules 2 and 2', and the reformer burner exhaust streams from both burners BR and BR' are combined and fed to the mixer M to power the turbine T. At this point, all of the air output from C is being sent to cathodes CA (CA') and little or no airflow is being returned to mixer M via V2. The result is that the fuel fed to the burner B' is completely eliminated, thereby reducing the total fuel flow to burners B and B' to only half of what it was before shutting down subsystem 4'. When load demand rises above 50% capacity the air pressurizing subsystem 4' is restarted and the two modules are disconnected.

It will be readily apparent that the overall operating efficiency of the multimodule power plant will be increased because of the lowered raw fuel consumption when load demand drops to 50% capacity or less. The interconnections are easy to provide and utilize conventional piping and valves. The valves V3 (V3'), V6 (V6'), V7 and V8 are simple valves which are merely open or closed, and the remaining valves are modulated valves which can throttle fluid movement through them. All of the valves in the system are controlled by the main power plant microprocessor control pmc which senses operating conditions and makes the necessary adjustments. The system is designed for use in pressurized power plants which typically operate at pressures of 35 psig or higher.

As previously noted, the system and method of this invention can be used in multiple module power stations wherein there are two or more power generation modules interconnected as described. The practical limits of this invention suggest that more than five power modules may not be adaptable to a single interconnecting sharing of pressurized air, and when five are interconnected, no more than four should have their air processing subsystems shut down at any one time for maximum efficiency.

Since many changes and variations of the disclosed embodiment of this invention may be made without departing from the inventive concept, it is not intended to limit the invention otherwise than as required by the appended claims.

What is claimed is:

1. A fuel cell power station comprising:
   (a) a plurality of fuel cell power modules each of which includes:
      (i) a fuel processing subsystem for reforming raw hydrocarbon fuel to a hydrogen-enriched fuel gas;
      (ii) an air pressurization subsystem for pressurizing air entering said modules to superatmospheric operating pressures and including a turbine-compressor;
      (iii) a power generating subsystem for electrochemically generating electrical current from the hydrogen-enriched fuel gas and air;
      (iv) a pressure air feed line conveying pressurized air from said compressor to said power generating system; and
      (v) a reformer burner exhaust line conveying hot exhaust products to said turbine;
   (b) means providing an interconnection between said air pressurization subsystems in at least two of said power generation modules including a first line interconnecting pressurized air fuel lines in the power generation modules, and a second line interconnecting the reformer burner exhaust lines in the power generation modules, whereby an air processing subsystem in one power generation module can provide pressurized air for more than one power generation module;
   (c) valve means in said interconnection;
   (d) sensor means for monitoring electric current output of said power generation modules; and
   (e) control means operably connected to said sensor means, to said air pressurization subsystems and to said valve means, to open and close the latter when the electric current output of the power modules reaches predetermined less-than-full-load levels and to concurrently shut down or start up an air pressurizing subsystem in one of the power generation modules.

2. A fuel cell power station of claim 1 wherein said air pressurization subsystems pressurize air to a pressure of 35 psig or greater.

3. The fuel cell power station of claim 2 wherein the turbocompressor in the said air pressurization subsystems all operate at a predetermined fixed rate.

4. The fuel cell power station of claim 1 wherein the number of interconnected power generation modules is "n" and wherein said predetermined less-than-full-load levels are determined from the equation $$X = \frac{n - a}{n}$$

wherein: "X" is the percentage of full load sensed; and "a" is the number of module air pressurization subsystems which can be shut down or started up at the proper sensed percentage.

5. The fuel cell power station of claim 4 wherein "n" is no greater than 5 and "a" is no greater than 4.

6. A method of operating a fuel cell power station of the type having a plurality of power generation modules each of which includes: a fuel processing subsystem for reforming hydrocarbon fuel to a hydrogen-enriched fuel gas; a power generating subsystem for electrochemically generating electric current; and an air pressurization subsystem for pressurizing air entering the modules to superatmospheric pressures, the air pressurization subsystems of a number of the modules being interconnected with others of the power generation modules so as to be capable of providing pressurized air for more than one of the interconnected power modules; said method comprising the steps of:
   (a) continuously monitoring electric current output from each power generation module;
   (b) operating each air pressurization subsystem independently in all of the interconnected power generation modules so long as the monitored electric current output from the modules exceeds a predetermined percentage of full current output;
   (c) shutting down at least one of the air processing subsystems in at least one of the interconnected power generation modules when the monitored electric current output falls below said predetermined percentage of full current output; and
   (d) providing pressurized air to all power generation modules whose air processing subsystems have been shut down from others of the interconnected power generation modules so long as the monitored electric current output remains below said predetermined percentage of full current output.

7. The method of claim 6 wherein the number of interconnected power generation modules is in the range of from 2 to 5, and the number of power generation modules whose air processing subsystems can be shut down is in the range of from 1 to 4.

* * * * *